Oct. 7, 1958 J. L. BARKER ET AL 2,855,257
CASING ASSEMBLY FOR PORTABLE RADAR APPARATUS
Filed Dec. 28, 1953 3 Sheets-Sheet 1
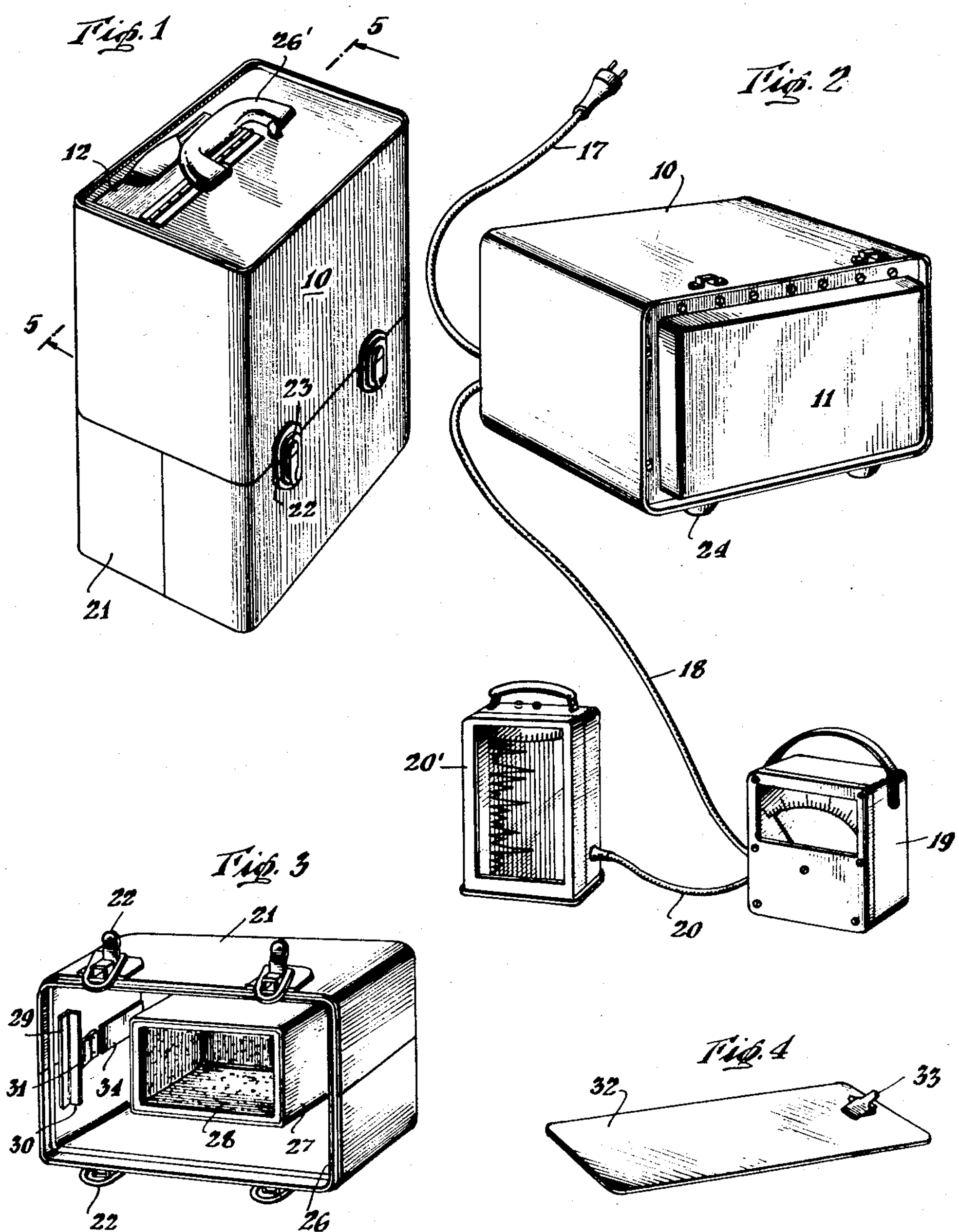
INVENTORS
JOHN L. BARKER
BY BERNARD J. MIDLOCK
Edward H. Eames
ATTORNEY CASING ASSEMBLY FOR PORTABLE RADAR APPARATUS
Filed Dec. 28, 1953 3 Sheets-Sheet 2
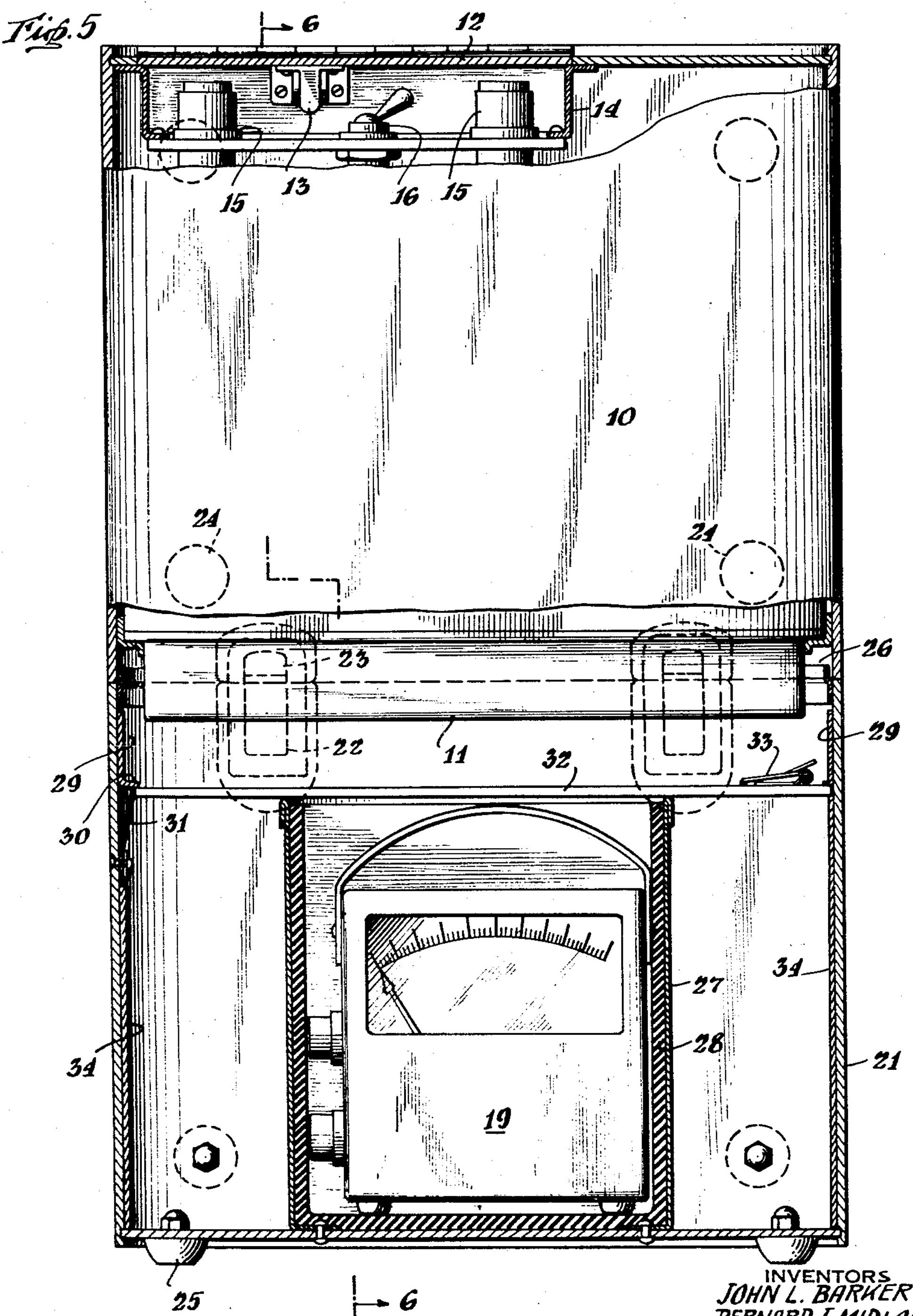
INVENTORS
JOHN L. BARKER
BERNARD J. MIDLOCK
BY
ATTORNEY CASING ASSEMBLY FOR PORTABLE RADAR APPARATUS
Filed Dec. 28, 1953
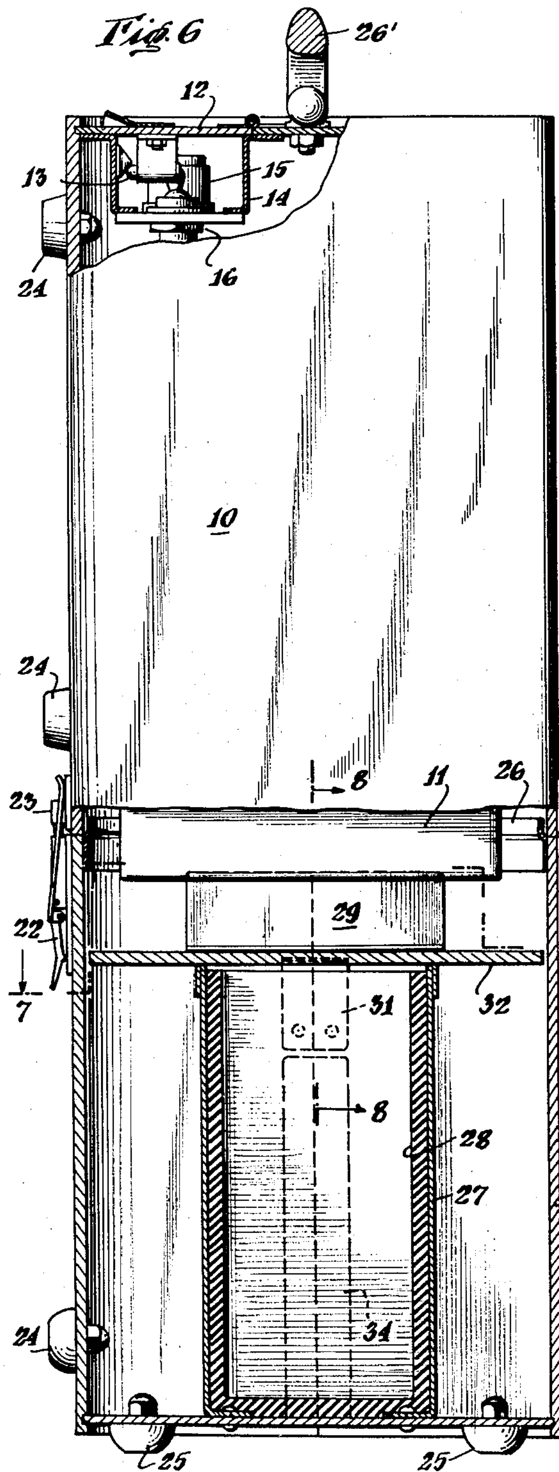
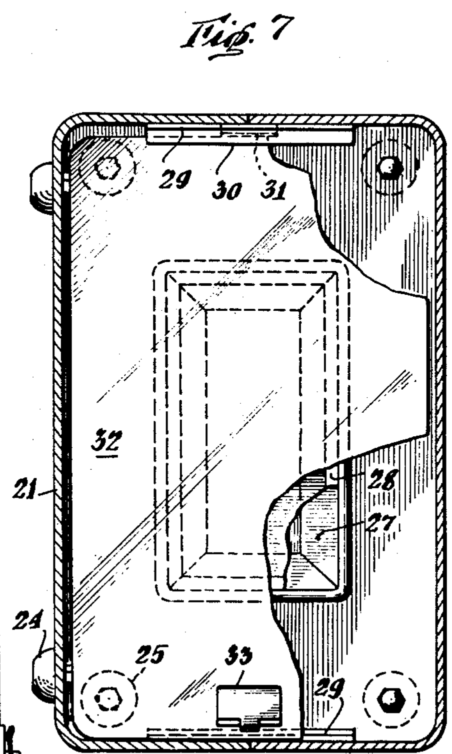
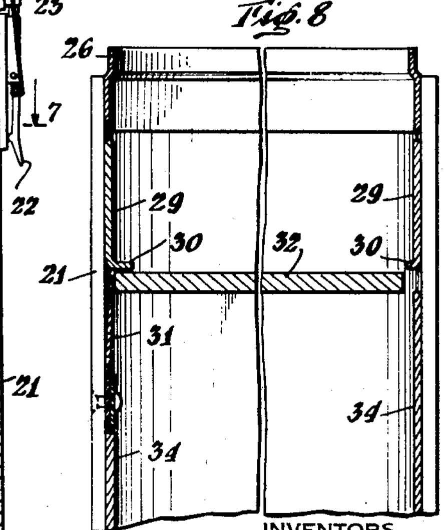
INVENTORS
JOHN L. BARKER
BY BERNARD J. MIDLOCK
Edward W. Eames
ATTORNEY 2,855,257

CASING ASSEMBLY FOR PORTABLE RADAR APPARATUS

John L. Barker and Bernard J. Midlock, Norwalk, Conn., assignors to Eastern Industries, Incorporated, East Norwalk, Conn., a corporation of Delaware Application December 28, 1953, Serial No. 400,547

13 Claims. (Cl. 312—7)

This invention relats to a functionally and structurally improved casing assembly especially intended to house the mechanism and accessory portions of a radar speed meter apparatus.

An example of one form of radar speed meter apparatus may be found in U. S. Patent 2,629,865, granted February 24, 1953, to one of the present applicants, John L. Barker, and assigned to the same assignee as the present application.

It is a primary object of the invention to furnish a casing structure which will compactly house the mechanism and accessory portions of an apparatus such as a speed meter and which will serve to protect the thus housed portions against the reasonable probability of damage. Moreover, by means of the present structure, a readily portable assembly is furnished and in which the parts can be substantially instantaneously assembled or disassembled to correspondingly house or render available the contained meter mechanism.

Still another object is that of furnishing a casing assembly which will include relatively few parts, each individually simple and rugged in construction, such parts being capable of ready manufacture and in use, functioning over long periods of time with freedom from all difficulties.

With these and other objects in mind, reference is had to the attached sheets of drawings illustrating one practical embodiment of the invention and in which:

Fig. 1 is a perspective view of the complete casing structure and showing the parts of the same in assembled condition;

Fig. 2 is a similar view of the casing portion housing the transmitter-receiver unit and showing the latter connected to a speed indicator or register as well as to a graphic recorder;

Fig. 3 is a perspective view of the cover assembly;

Fig. 4 is a similar view of a clip or data board included in the grouping of the casing parts;

Fig. 5 is a sectional side view in enlarged scale taken along the line 5—5 and in the direction of the arrows as indicated in Fig. 1;

Fig. 6 is a sectional edge view taken along the line 6—6 and in the direction of the arrows as indicated in Fig. 5;

Fig. 7 is a transverse sectional view taken along the line 7—7 and in the direction of the arrows as indicated in Fig. 6; and Fig. 8 is a fragmentary sectional view taken along the line 8—8 and in the direction of the arrows as indicated in Fig. 6.

In Figs. 1 and 2, the casing for the transmitter-receiver unit, has been indicated by the numeral 10 and has one end defined by a cover 11 presenting a bulged portion of lesser area than the main casing 10. This bulged portion may house the aerial or antenna (not shown) of the mechanism and is conveniently formed of a suitable material such as fiberglass while the remaining portions of the assembly are to the greatest extent provided from sheet metal.

The opposite end of casing 10 may include within its area a hingedly mounted door 12 which, as shown, can include a bulged portion such that a space is provided for the reception of the operator's fingers to enable the panel or door to be swung to a position perpendicular or inclined with respect to the end wall of which it forms a part. A detent assembly 13 normally maintains panel 12 in closed position as in Fig. 6. When the panel is shifted to open position, then the interior of an underlying well portion 14 is rendered accessible. Within the latter, connecting sockets or plugs 15 are disposed. Also, as illustrated, a control switch 16 may extend upwardly from the base of the well; this switch controlling the electrical circuit which energizes the transmitter-receiver within casing 10.

Returning to Fig. 2, a power supply cable 17 may be connected to one of the terminal assemblies 15. A second cable may connect the other of these terminals with the indicator or register unit 19. The latter has its face provided with indicia traversed by a pointer or needle such that the registered result is translated into miles per hour. Also, if desired, a cable 20 may connect the indicator 19 with a graphic recorder 21 which will serve to provide a permanent record of the results registered by meter 19. Ordinarily, however, this recorder will not be employed in that the indication afforded by the meter would be adequate for all practical purposes.

A cover 21 likewise preferably formed of metal forms a part of the assembly and may be secured to casing portion 10 by quick-detachable fastening elements. These preferably take the form of swingable bail assemblies 22 secured to the cover and which cooperate with conventional elements 23 extending outwardly from the upper and lower faces of casing 10. As shown particularly in Figs. 5 to 7 inclusive, legs or supporting portions 24 may extend from the side face of casing 10 and cover 21. These parts are preferably formed of rubber and have a height substantially equal to that of the adjacent bail assemblies 22. Further legs or supporting portions 25 may extend from the lower face of cover 21 so that the entire assembly may rest upon these elements.

The free edge of cover 21 is defined by a framing strip 26 applied to the inner face of that cover adjacent such edge. The parts are proportioned in a manner such that the edge of casing 10 adjacent the closure panel or cover 11 may be disposed in telescopic relationship with respect to strip 26. Extending upwardly from the base of cover 21 is a well portion 27, also conveniently formed of metal. The height of the latter is less than that of cover 21. The base and also the inner face of well portion 27 may be lined with a shock absorbing and protective layer 28. As will be seen, strips 29 are secured to the inner face of cover 21 and terminate in inwardly extending ledge portions 30. These lie in a plane just beyond the outer edge of well 27. A spring strip 31 is also secured to the inner face of the cover at a point immediately below one of the ledge or lip portions 30. A data board 32 is provided preferably from a metal panel and has a width and length substantially equal to the interior measurements of cover 21. This board is also preferably provided with a clip assembly 33. As illustrated especially in Fig. 8, strips are applied to the inner face of cover 21 and extend perpendicular with respect to strip 29. One of these strips as indicated at 34 has its upper edge terminating at a point spaced from the adjacent ledge 30 a distance substantially equal to the thickness of panel 32.

Assuming that the apparatus is in use as in Fig. 2 and that only the indicator 19 is being employed, the operator (with the mechanism suitably aimed) may make records on a clip sheet resting on board 32 and based upon the registration provided by indicator 19. Under these circumstances, cover 21 will not be in use. Upon it being desired to package the apparatus, switch 16 may be operated and lead 17 disconnected from the source of power supply. Lead 18 will also be disconnected from the terminal 15 with which it is coupled and these leads are conveniently disposed within the space intervening the inner face of cover 21 and well 27. The indicator or meter 19 will be positioned within that well. So positioned, it will rest upon the cushioning material 28 covering the base of the same and may also bear against such material if the latter covers the inner side faces of the well. Its entire body will be received within the well, which latter has a height slightly in excess of that of unit 19.

Panel 32 may now have one of its end edges shifted to a position underlying ledge 30 and bearing against spring strip 31. Thereupon, by shifting toward the latter, the spring flexes outwardly and the opposite edge of the panel may be shifted past the second ledge portion 30. By releasing manual pressure, spring 31 will shift the panel so that its opposite ends underlie the two ledges or lips and the panel thus provides a covering for well portion 27 to completely house meter unit 19.

As will be appreciated, with the apparatus in use, it has been supported upon the legs or mounting portions 24 associated with casing 10. Likewise, cover 21 has been similarly supported by substantially identical portions and the bail assemblies 22 which are of a height in effect equal to these mounting portions. With panel 32 in position, casing 10 may be superposed upon cover 21 and so that the framing strip 26 overlaps the inner lower face of the main casing. In this position of the parts, the edge of the latter will bear against the upper edge of cover 21, as shown in Figs. 5 and 6. If now bail assemblies 22 are operated to engage with and retain the securing portions 23, units 10 and 21 will, in effect, become a single piece or assembly. By grasping handle 26, they may be disposed to be supported upon mounting units 24 or 25. With cover or panel 12 closed, the entire apparatus is safeguarded against the entrance of casual moisture. Obviously the apparatus may be set up with minimum expenditure of effort and time by a reversal of the aforedescribed procedures. It is also apparent that the entire assembly is easily portable and that the bulged portion 11 of the cover housing the aerial will be amply protected with the parts assembled. Likewise with the parts thus assembled, unit 19 is adequately protected.

Accordingly, among others, the several objects of the invention as specifically aforenoted are achieved. Obviously numerous changes in construction and re-arrangements of the parts might be resorted to without departing from the spirit of the invention as defined by the claims.

We claim:

1. In combination a casing enclosing a radar transmitter-receiver, an antenna-enclosing part bulged outwardly from one end of said casing for passing radio wave energy therethrough for said transmitter-receiver, a cover, means for detachably securing said cover to such end of the casing and coextensive therewith to serve as cover and base therefor, said cover receiving and housing said bulged part, a movable panel mounted adjacent the opposite end of said casing to afford access to electrical connections for the transmitter-receiver, a handle connected to the latter end of said casing to one side of said panel and supporting parts extending from both said casing and cover.

2. A combination as in claim 1 in which said supporting parts are located along a common side thereof and cooperating to support said casing and cover as one unit when so secured together and standing on such common side.

3. A combination as in claim 2, and said cover having a base and sides, and additional supporting parts extending from the base of said cover to support said casing when standing alone on its base and to support said casing and cover as a unit when secured together and standing on said base.

4. A combination as in claim 1 and the remaining parts of said casing other than said bulged part being made of material substantially impervious to radio wave energy.

5. A combination as in claim 1, and at least said cover being made of material substantially impervious to radio wave energy.

6. A combination as in claim 1, and in which said supporting parts comprise projections of rubber-like material serving as feet for supporting said casing and said cover in multiple positions.

7. In a portable radar speedmeter, a case assembly including detachable matching upper and lower sections, said upper section housing a radar transmitter-receiver and including electrical connection means for the transmitter-receiver and a carrying handle at one end of such upper section, and including a bulging portion at its opposite end enclosing an antenna for said transmitter-receiver for passing radio wave energy therethrough, and said lower section of such assembly having a base and sides and a partition upstanding from said base providing a plurality of wells for the indicating meter of the speedmeter and for interconnection cables therefor, the partition being recessed within said lower section to provide space for housing the bulging antenna enclosing portion of the upper section when the upper and lower sections are assembled together, and latching means for locking the two sections together as a unit for carrying purposes from said handle but readily detachable for separation of the two sections for operation of the speedmeter.

8. A combination as in claim 7 and in which said partition forms concentric wells within said lower section providing a central well for safe carrying space for the meter of said speedmeter and a surrounding well for the interconnecting cables.

9. A combination as in claim 7, and in which said lower section and said upper section except for said bulging portion are made of material substantially impervious to radio wave energy.

10. A combination as in claim 7, and in which at least said lower section is made of material substantially impervious to radio wave energy.

11. A combination as in claim 7 and including a panel adapted to substantially cover said wells and separate the latter from the bulging antenna enclosing portion of the upper section and means for detachably retaining said panel within said lower section to clear the bulging antenna enclosing portion of the upper section.

12. A combination as in claim 11 in which said panel is a clip board.

13. A combination as in claim 8 and in which said central well includes cushioning material for protecting said meter.

References Cited in the file of this patent

UNITED STATES PATENTS

| | | |
|---|---|---|
| 424,603 | Fawor | Apr. 1, 1890 |
| 545,007 | Bertels | Aug. 20, 1895 |
| 633,864 | Lindsey | Sept. 26, 1899 |
| 1,521,650 | Rudolph | Jan. 26, 1925 |
| 1,617,699 | Berg | Feb. 15, 1927 |
| 1,941,998 | Padelford | Jan. 2, 1934 |
| 2,139,618 | Hall | Dec. 6, 1938 |
| 2,189,455 | Tyzzer | Feb. 6, 1940 |
| 2,290,328 | Hedfield | July 21, 1942 |
| 2,337,987 | Galloway | Dec. 28, 1943 |
| 2,405,955 | Hunt | Aug. 20, 1946 |
| 2,486,536 | Olson | Nov. 1, 1949 |
| 2,492,807 | Marcus | Dec. 27, 1949 |
| 2,548,954 | Davis | Apr. 17, 1951 |
| 2,640,622 | Sabatino | June 2, 1953 |